US009520721B2

(12) United States Patent
Luo (10) Patent No.: US 9,520,721 B2
(45) Date of Patent: Dec. 13, 2016

(54) SOLAR PHOTOVOLTAIC THREE-PHASE MICRO-INVERTER AND SOLAR PHOTOVOLTAIC POWER GENERATION SYSTEM

(71) Applicant: Yuhao Luo, Jiaxing (CN)

(72) Inventor: Yuhao Luo, Jiaxing (CN)

(73) Assignee: Altenergy Power System, Inc., Jiaxing (CN)

( * ) Notice: Subject to any disclaimer, the term of this patent is extended or adjusted under 35 U.S.C. 154(b) by 727 days.

(21) Appl. No.: 13/973,705

(22) Filed: Aug. 22, 2013

(65) Prior Publication Data

US 2013/0334888 A1 Dec. 19, 2013

Related U.S. Application Data

(63) Continuation of application No. PCT/CN2012/070048, filed on Jan. 5, 2012.

(30) Foreign Application Priority Data

Feb. 23, 2011 (CN) .......................... 2011 1 0044171

(51) Int. Cl.
H02J 3/38 (2006.01)

(52) U.S. Cl.
CPC .................. H02J 3/38 (2013.01); H02J 3/383 (2013.01); Y02E 10/563 (2013.01); Y10T 307/707 (2015.04)

(58) Field of Classification Search
USPC ....................................................... 307/42, 82
See application file for complete search history.

(56) References Cited

U.S. PATENT DOCUMENTS 7,663,268 B2 * 2/2010 Wen ...................... H02M 5/458
307/18
7,855,473 B2 * 12/2010 Fornage .................... H02J 3/26
307/82

(Continued)

FOREIGN PATENT DOCUMENTS

CN 101093940 A 12/2007
CN 200994112 Y 12/2007

(Continued)

OTHER PUBLICATIONS

Xiao, Weidong, "Topology Study of Photovoltaic Interface for Maximum Power Point Tracking," IEEE Transactions on Industrial Electronics, vol. 54, No. 3, Jun. 2007, pp. 1696-1704.*

(Continued)

*Primary Examiner* — Joseph Chang
(74) *Attorney, Agent, or Firm* — Kilpatrick Townsend & Stockton LLP (57) ABSTRACT

A solar photovoltaic three-phase micro-inverter comprises: DC terminals, coupled with three DC photovoltaic assemblies adjacent to each other; three single-phase inverter circuits having input terminals coupled respectively with the three DC photovoltaic assemblies via the DC terminals, for converting the DC currents generated by the three DC photovoltaic assemblies to AC currents, respectively; AC terminals coupled with a three-phase AC power grid; wherein output terminals of each single-phase inverter circuit are coupled respectively with a neutral wire and one of the three phases of the three-phase AC power grid. A solar photovoltaic power generation system is also provided. The three single-phase inverter circuits can be integrated as above Because the three DC photovoltaic assemblies on one three-phase micro-inverter are disposed adjacently and have similar environment conditions, such as illumination, tem- (Continued)

perature, etc., the three-phase AC current can be well balanced.

12 Claims, 6 Drawing Sheets

(56) References Cited

U.S. PATENT DOCUMENTS

| | | | |
|---|---|---|---|
| 8,212,408 B2 * | 7/2012 | Fishman | H02J 3/36 307/43 |
| 2010/0236612 A1 | 9/2010 | Khajehoddin | |

FOREIGN PATENT DOCUMENTS

| | | |
|---|---|---|
| CN | 102122897 A | 7/2011 |
| JP | H08140360 A | 5/1996 |

OTHER PUBLICATIONS

Li, Z., et al., "400 Hz High-Power Voltage-source Inverter with Digital Control," Proceedings Chinese Society of Electrical Engineering, 2009, vol. 29, No. 6, pp. 36-42. English Abstract Only.

\* cited by examiner

SOLAR PHOTOVOLTAIC THREE-PHASE MICRO-INVERTER AND SOLAR PHOTOVOLTAIC POWER GENERATION SYSTEM

CROSS-REFERENCES TO RELATED APPLICATIONS

This application is a Continuation of International Application No. PCT/CN2012/070048, International Filing Date Jan. 5, 2012, and which claims the benefit of CN patent application No. 201110044171.0, filed Feb. 23, 2011, the disclosures of both applications being incorporated herein by reference.

TECHNICAL FIELD

The invention relates to the field of solar photovoltaic technology, and more particularly, to a solar photovoltaic three-phase micro-inverter and a solar photovoltaic power generation system.

BACKGROUND ART

The inverter in a solar photovoltaic power generation system recently trends to employ distributed micro inverters (micro-inverters). The micro-inverter may provide maximum power point control for each direct current (DC) photovoltaic assembly, such that each DC photovoltaic assembly can produce a maximum energy, thereby improving the performance of the whole solar photovoltaic power generation system. Furthermore, the micro-inverter may also produce an alternating current (AC) low voltage output, rather than the high DC voltage output as produced by a centralized inverter system, so that the security and efficiency of the system can be improved.

In a photovoltaic power generation system that uses micro-inverters, each of a plurality of branches is coupled with a string of micro-inverters and other related components via a distribution box. A large photovoltaic power generation system is typically coupled using a three-phase AC power grid. However, a real three-phase micro-inverter will have much more electronic elements than a single-phase micro-inverter, and thus is rather complicated to implement. An existing alternative method is to connect a plurality of single-phase micro-inverters in series as three groups, with each group of single-phase micro-inverters being further coupled to one phase of a commercial three-phase AC power grid. In order to ensure the balance of the current amplitudes between the three phases of the AC power grid, the three groups of single-phase micro-inverters need to have the same micro-inverters and DC photovoltaic assemblies. This requirement causes difficulty in the design and installation as well as high cost of the solar photovoltaic power generation system.

Figure 1:
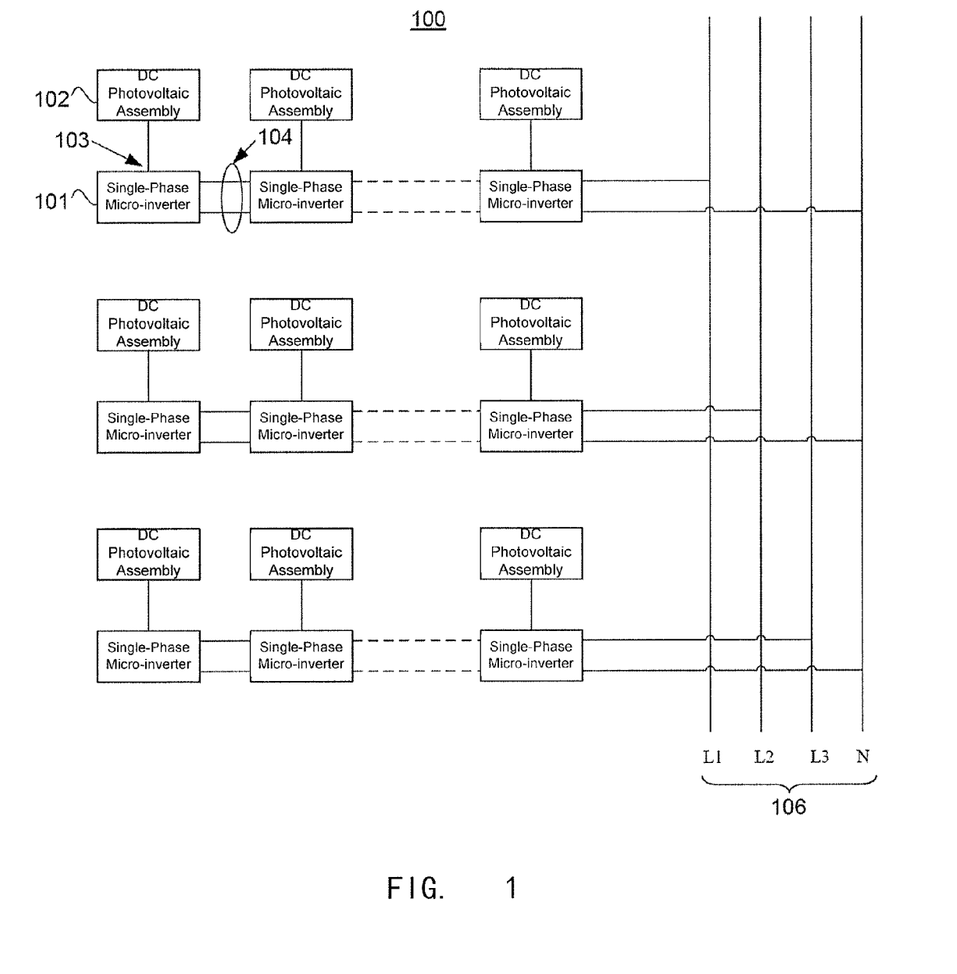
FIG. 1 is a schematic block diagram of a solar photovoltaic power generation system in the prior art.

FIG. 1 is a schematic block diagram of a solar photovoltaic power generation system in the prior art. The solar photovoltaic power generation system 100 comprises a plurality of single-phase micro-inverters 101 connected in series as several groups (three groups are illustrated), which are coupled with a three-phase AC power grid, respectively. Each single-phase micro-inverter 101 generates a current having the same phase as the corresponding voltage of the three-phase AC power grid 106, and thus a grid-connected output can be obtained. Each single-phase micro-inverter 101 may be coupled with a DC photovoltaic assembly 102 via a DC terminal 103, to convert the DC current generated by the DC photovoltaic assembly 102 to an AC current. Each single-phase micro-inverter 101 may be coupled with a previous/next single-phase micro-inverter 101 via AC terminals 104, so that the plurality of single-phase micro-inverters 101 in each row may be coupled in series as a branch. The AC terminals 104 of the last single-phase micro-inverter 101 of each branch may be used as AC output terminals of the entire branch, and may be coupled to the neutral wire N and one of the live wires L1, L2, or L3 of the three-phase AC power grid 106. Accordingly, the three branches as shown may be coupled to L1/N, L2/N, and L3/N, respectively.

In the operation of photovoltaic power generation, the system 100 may couple the generated AC currents via a distribution box to the three-phase AC power grid 106, such as a commercial 220V/380V power grid. Consequently, the first phase current of the AC currents may be carried by the live wire L1 of the three-phase AC power grid 106, the second phase current of the AC currents may be carried by the live wire L2, and the third phase current of the AC currents may be carried by the live wire L3. The current carried by the neutral wire N is the sum of the three phase currents. Ideally, the magnitudes of the currents on the live wires L1, L2, and L3 are balanced, with a phase difference of 120 degrees, so that the current on the neutral wire N shall be zero. However, in order to achieve the balance between the three phases of the three-phase AC power grid 106, balanced currents should be generated in the three branches of the photovoltaic power generation system 100 as shown. That is, the three groups of DC photovoltaic assemblies 102 and the three groups of single-phase micro-inverters 101 should generate currents having the same magnitude. If the system 100 is rather large in scale, it will be quite difficult to ensure that the environment conditions where the various DC photovoltaic assemblies 102 are located, such as illumination, temperature, etc., are the same, thus it will be very difficult to maintain the balance of the AC currents between the three phases of the input power grid 106, which causes difficulty in the design and installation as well as high cost of the photovoltaic power generation system 100.

SUMMARY

Embodiments of the invention intend to solve the technical problems of providing a solar photovoltaic three-phase micro-inverter, to ensure the balance of the three-phase AC current output to the three-phase AC power grid, thereby simplifying the design and installation of the photovoltaic power generation system.

In order to solve the above technical problems, embodiments of the invention provides a solar photovoltaic three-phase micro-inverter, which comprises:

DC terminals, coupled with three DC photovoltaic assemblies which are adjacent to each other, for receiving DC currents generated by the DC photovoltaic assemblies;

three single-phase inverter circuits having input terminals coupled respectively with the three DC photovoltaic assemblies via the DC terminals, for converting the DC currents generated by the three DC photovoltaic assemblies to AC currents, respectively;

AC terminals coupled with a three-phase AC power grid, for grid-connectedly outputting the AC currents generated by the three single-phase inverter circuits;

wherein output terminals of each single-phase inverter circuit are coupled respectively with a neutral wire and one of the three phases of the three-phase AC power grid.

Optionally, the three single-phase inverter circuits are completely the same.

Optionally, the single-phase inverter circuit comprises a DC-AC conversion circuit, a DC voltage and current detection circuit, an AC voltage and current detection circuit, and a filter circuit.

Optionally, the single-phase inverter circuit further comprises a control circuit and a communication circuit.

Optionally, the three single-phase inverter circuits share a comparison circuit, a control circuit, and a communication circuit externally, wherein the comparison circuit compares an input/output current and voltage of the three single-phase inverter circuits respectively, and wherein the control circuit will adjust the power conversion of the three single-phase inverter circuits if unbalance between the three phases is found.

Accordingly, embodiments of the invention also provide a solar photovoltaic power generation system, comprising a plurality of solar photovoltaic three-phase micro-inverters, the plurality of three-phase micro-inverters having AC terminals coupled with the respective phases and neutral wire of a three-phase AC power grid respectively, wherein each three-phase micro-inverter comprises:

DC terminals, coupled with three DC photovoltaic assemblies which are adjacent to each other, for receiving DC currents generated by the DC photovoltaic assemblies;

three single-phase inverter circuits having input terminals coupled respectively with the three DC photovoltaic assemblies via the DC terminals, for converting the DC currents generated by the three DC photovoltaic assemblies to AC currents, respectively;

AC terminals coupled with the three-phase AC power grid, for grid-connectedly outputting the AC currents generated by the three single-phase inverter circuits;

wherein output terminals of each single-phase inverter circuit are coupled respectively with a neutral wire and one of the three phases of the three-phase AC power grid.

Optionally, the AC terminals of the plurality of three-phase micro-inverters are coupled with each other first to form a three-phase micro-inverter string, which is then coupled with the three-phase AC power grid.

Optionally, the plurality of three-phase micro-inverters are independent from each other, and have their AC terminals coupled with the respective phases and neutral wire of the three-phase AC power grid, respectively.

Optionally, the three single-phase inverter circuits in each three-phase micro-inverter are completely the same.

Optionally, the single-phase inverter circuit comprises a DC-AC conversion circuit, a DC voltage and current detection circuit, an AC voltage and current detection circuit, and a filter circuit.

Optionally, the single-phase inverter circuit further comprises a control circuit and a communication circuit.

Optionally, the three single-phase inverter circuits in each three-phase micro-inverter share a comparison circuit, a control circuit, and a communication circuit externally, wherein the comparison circuit compares an input/output current and voltage of the three single-phase inverter circuits respectively, and wherein the control circuit will adjust the power conversion of the three single-phase inverter circuits if unbalance between the three phases is found.

As compared with the prior art, embodiments of the invention have the following advantages:

The solar photovoltaic three-phase micro-inverter of embodiments of the invention can integrate three single-phase inverter circuits, which have input terminals coupled respectively with three DC photovoltaic assemblies, and output terminals coupled with the neutral wire and one of the three phases of the three-phase AC power grid, respectively. Because the three DC photovoltaic assemblies on one three-phase micro-inverter are disposed adjacently and thus have similar environment conditions, such as illumination, temperature, etc., the three-phase AC current can be well balanced, without employing excessive elements.

Furthermore, the balance between the three phases of the three-phase AC current coupled to the three-phase AC power grid can be achieved by adjusting the power conversion of the single-phase inverter circuit through the control circuit of the three-phase micro-inverter.

DESCRIPTION OF FIGURES

The above and other features, properties and advantages of the invention will be more apparent from the following description in conjunction with the drawings and embodiments, wherein.

DETAILED DESCRIPTION

The invention will be further described in conjunction with the following specific embodiments and the drawings, although the invention is not so limited.

Figure 2:
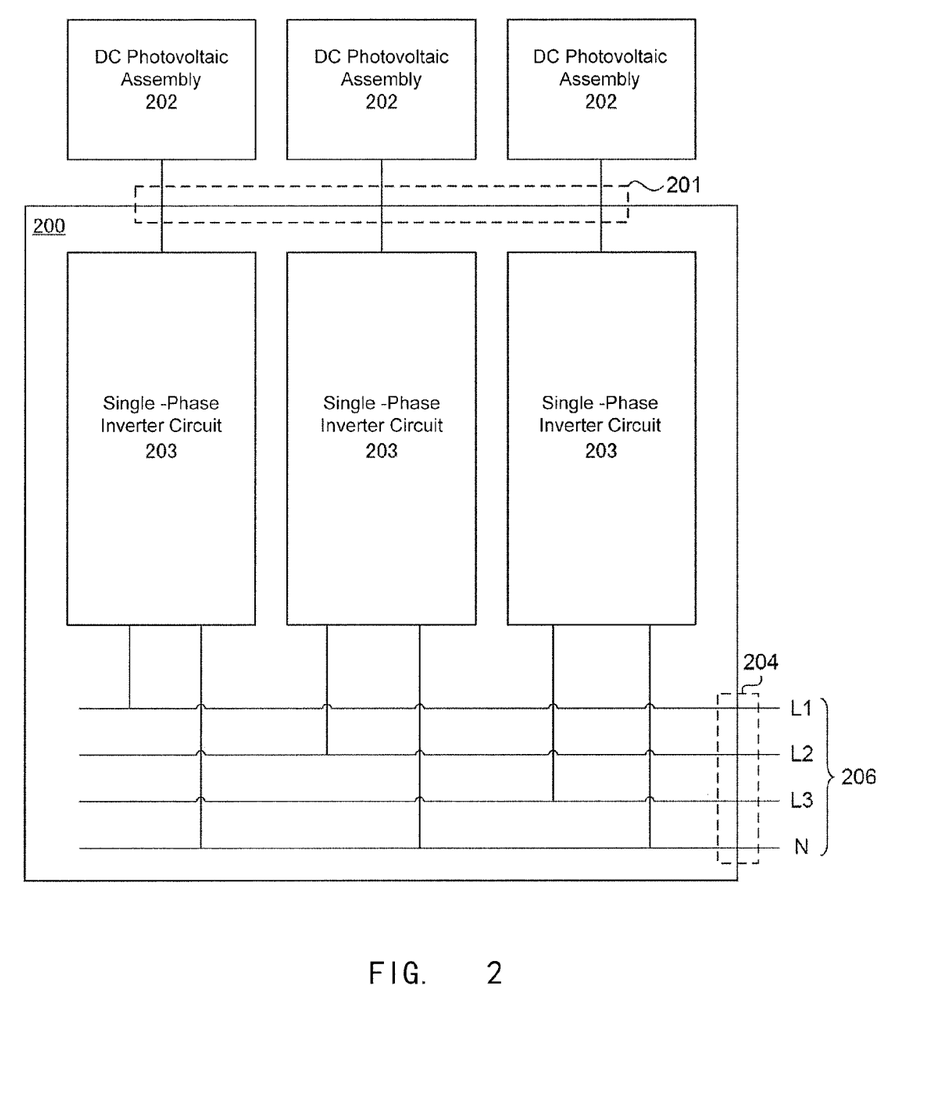
FIG. 2 is a schematic block diagram of a solar photovoltaic three-phase micro-inverter in an embodiment of the invention.

FIG. 2 is a schematic block diagram of a solar photovoltaic three-phase micro-inverter in an embodiment of the invention. As shown, the three-phase micro-inverter 200 may comprise:

DC terminals 201, coupled with three DC photovoltaic assemblies 202 which are adjacent to each other, for receiving DC currents generated by the DC photovoltaic assemblies 202;

three single-phase inverter circuits 203 having input terminals coupled respectively with the three DC photovoltaic assemblies 202 via the DC terminals 201, for converting the DC currents generated by the three DC photovoltaic assemblies 202 to single-phase AC currents, respectively, wherein the above three single-phase inverter circuits 203 may employ completely the same structure;

AC terminals 204 which include four wires and couple with a three-phase AC power grid 206, for grid-connectedly outputting the AC currents generated by the three single-phase inverter circuits 203;

wherein the output terminals of each single-phase inverter circuit 203 may be coupled respectively with the neutral wire N and one of the three phases L1, L2, or L3 of the three-phase AC power grid 206. As shown, the output terminals of the single-phase inverter circuit 203 on the left are coupled to the live wire L1 and neutral wire N of the three-phase AC power grid 206, respectively, the output terminals of the single-phase inverter circuit 203 in the middle are coupled to the live wire L2 and neutral wire N of the three-phase AC power grid 206, respectively, and the output terminals of the single-phase inverter circuit 203 on the right are coupled to the live wire L3 and neutral wire N of the three-phase AC power grid 206, respectively. In this way, the three single-phase inverter circuits 203 generate AC currents having phases that match the voltages of the three-phase AC power grid 206. In addition, since the three single-phase inverter circuits 203 employ completely the same structure, the magnitude of the AC current generated by each single-phase inverter circuit 203 is the same, then the three-phase micro-inverter 200 will generate a three-phase AC current which matches the three-phase AC power grid 206.

Figure 3:
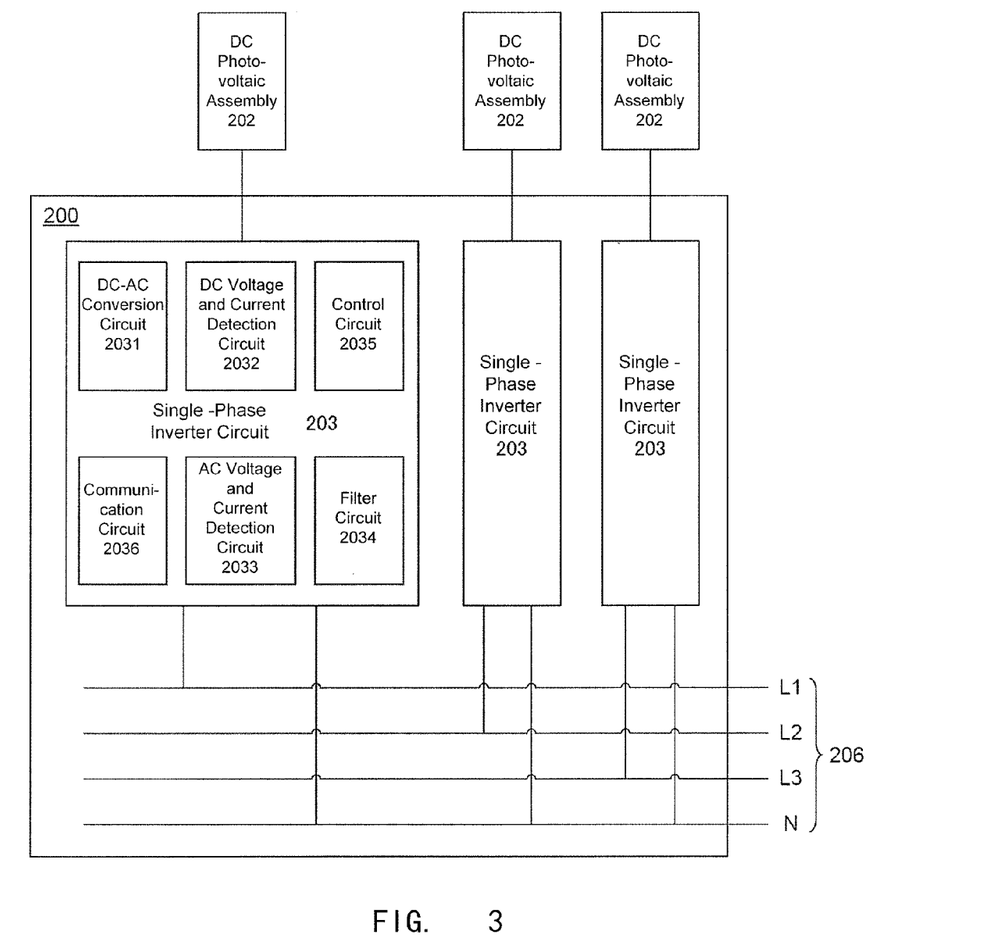
FIG. 3 is a specific schematic block diagram of a single-phase inverter circuit of a solar photovoltaic three-phase micro-inverter in an embodiment of the invention.

FIG. 3 is a specific schematic block diagram of a single-phase inverter circuit of a solar photovoltaic three-phase micro-inverter in an embodiment of the invention. As shown, the single-phase inverter circuit 203 may comprise a DC-AC conversion circuit 2031, a DC voltage and current detection circuit 2032, an AC voltage and current detection circuit 2033, and a filter circuit 2034.

In this embodiment, the single-phase inverter circuit 203 may further comprise a control circuit 2035 and a communication circuit 2036. Of course, in this embodiment, the single-phase inverter circuit 203 may further comprise other necessary components which are known by those skilled in the art, without being limited to the above circuit structure.

Figure 4:
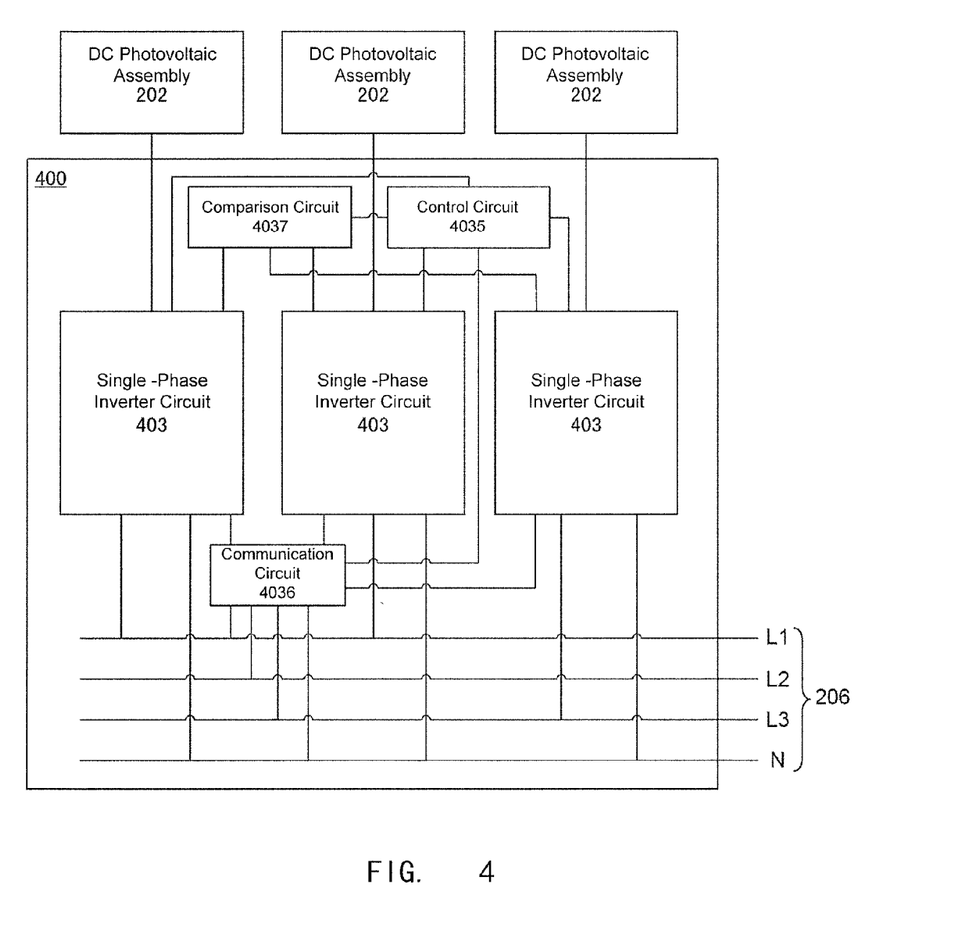
FIG. 4 is a schematic diagram of a solar photovoltaic three-phase micro-inverter with three single-phase inverter circuits sharing a comparison circuit, a control circuit and a communication circuit externally in another embodiment of the invention.

FIG. 4 is a schematic diagram of a solar photovoltaic three-phase micro-inverter with three single-phase inverter circuits sharing a comparison circuit, a control circuit and a communication circuit externally in another embodiment of the invention. As shown, in the three-phase micro-inverter 400, a control circuit 4035, a communication circuit 4036, and a comparison circuit 4037 are external to three single-phase inverter circuits 403, and are common parts shared by the three single-phase inverter circuits 403. Such a three-phase micro-inverter 400 can eliminate two sets of common circuits, so that not only the manufacture cost can be reduced, but also the reliability of the three-phase micro-inverter can be improved.

In this embodiment, the output currents and voltages of the three single-phase inverter circuits 403 will be detected respectively by the AC voltage and current detection circuits therein (not shown), and will be compared by the comparison circuit 4037. If unbalance between the three phases is found, the control circuit 4035 will adjust the respective power conversion operation of the three single-phase inverter circuits 403 to achieve the balance thereof. As a result, the output of the three-phase micro-inverter 400 can be maintained as a balanced three-phase AC current. Furthermore, the input currents and voltages of the three single-phase inverter circuits 403 may be used by the DC voltage and current detection circuit (not shown) to detect the balance between the three phases.

Figure 5:
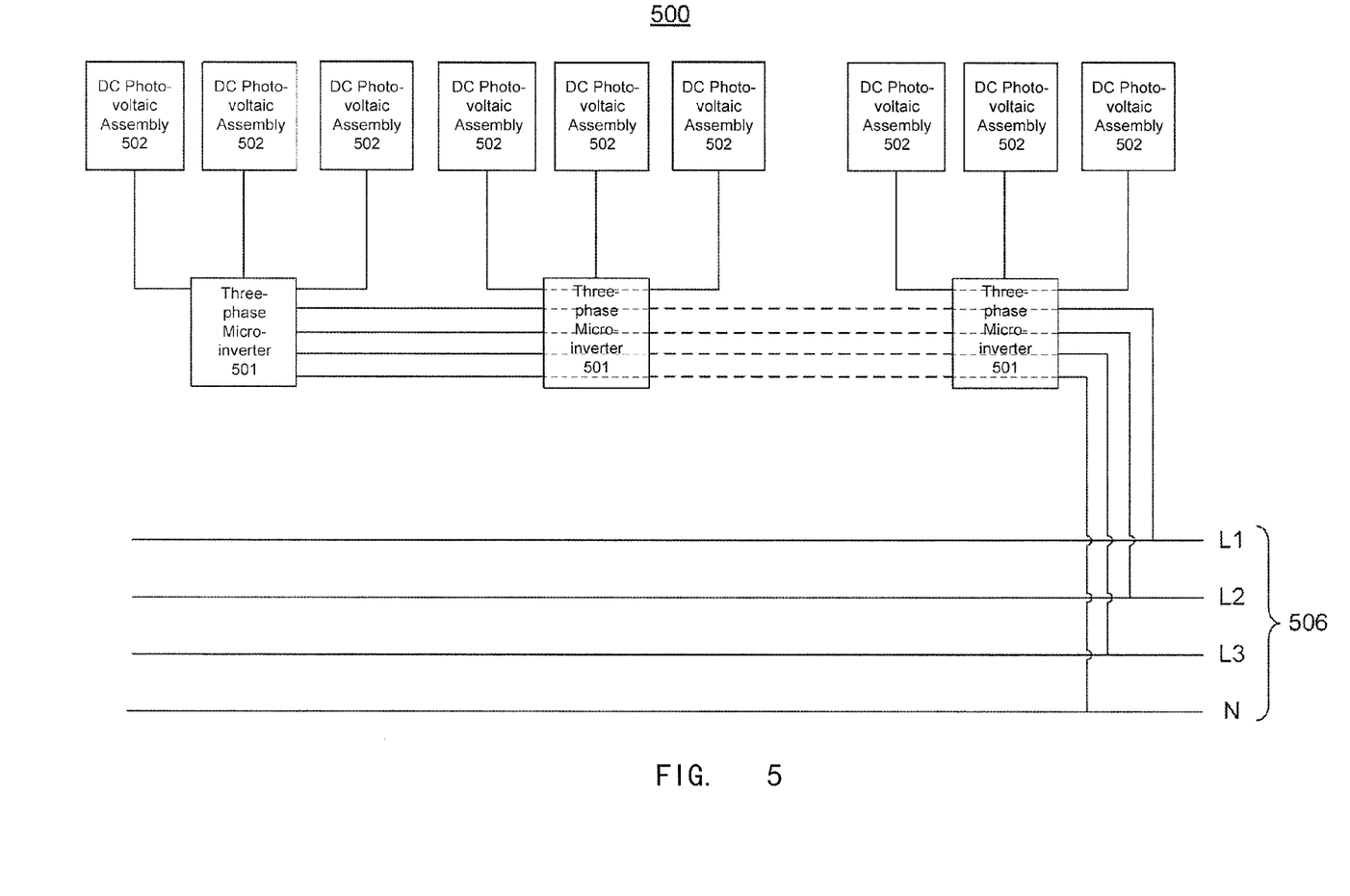
FIG. 5 is a schematic block diagram of a solar photovoltaic power generation system comprising a plurality of three-phase micro-inverters in an embodiment of the invention.

FIG. 5 is a schematic block diagram of a solar photovoltaic power generation system comprising a plurality of above three-phase micro-inverters in an embodiment of the invention. As shown, the solar photovoltaic power generation system 500 may comprise a plurality of solar photovoltaic three-phase micro-inverter 501, wherein the AC terminals of the plurality of three-phase micro-inverters 501 are coupled with the respective phases L1, L2, and L3 and neutral wire N of the three-phase AC power grid 506 respectively, wherein each three-phase micro-inverter 501 may have the same specific structure as that shown in FIG. 2, and may comprise:

DC terminals 201, coupled with three DC photovoltaic assemblies 202 which are adjacent to each other, for receiving DC currents generated by the DC photovoltaic assemblies 202;

three single-phase inverter circuits 203 having input terminals coupled respectively with the three DC photovoltaic assemblies 202 via the DC terminals 201, for converting the DC currents generated by the three DC photovoltaic assemblies 202 to single-phase AC currents, respectively, wherein the above three single-phase inverter circuits 203 may employ completely the same structure;

AC terminals 204 which include four wires and couple with a three-phase AC power grid 206, for grid-connectedly outputting the AC currents generated by the three single-phase inverter circuits 203;

wherein the output terminals of each single-phase inverter circuit 203 may be coupled respectively with the neutral wire N and one of the three phases L1, L2, or L3 of the three-phase AC power grid 206. As shown, the output terminals of the single-phase inverter circuit 203 on the left are coupled to the live wire L1 and neutral wire N of the three-phase AC power grid 206, respectively, the output terminals of the single-phase inverter circuit 203 in the middle are coupled to the live wire L2 and neutral wire N of the three-phase AC power grid 206, respectively, and the output terminals of the single-phase inverter circuit 203 on the right are coupled to the live wire L3 and neutral wire N of the three-phase AC power grid 206, respectively. In this way, the three single-phase inverter circuits 203 generate AC currents having phases that match the voltages of the three-phase AC power grid 206. In addition, since the three single-phase inverter circuits 203 employ completely the same structure, the magnitude of the AC current generated by each single-phase inverter circuit 203 is the same, then the three-phase micro-inverter 200 will generate a three-phase AC current which matches the three-phase AC power grid 206. The design and installation of the photovoltaic power generation system 500 may be simplified by the method and facility for producing a three-phase AC current with three adjacent DC photovoltaic assemblies 202.

Figure 6:
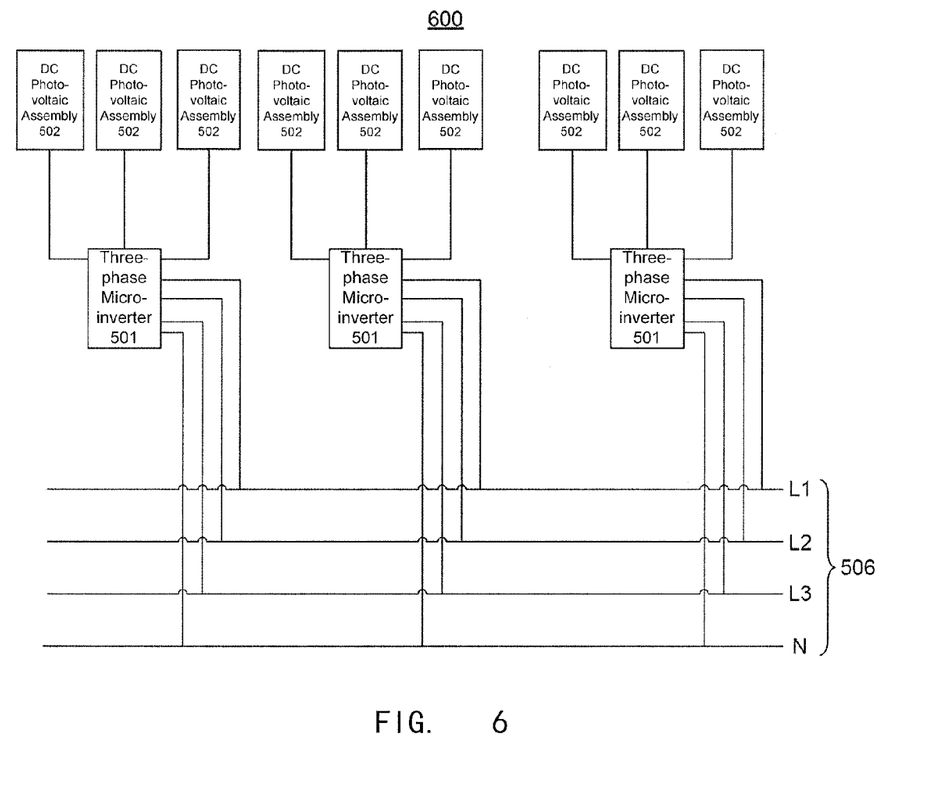
FIG. 6 is a schematic block diagram of a solar photovoltaic power generation system comprising a plurality of three-phase micro-inverters in another embodiment of the invention.

In this embodiment, as shown in FIG. 5, each three-phase micro-inverter 501 is coupled with three DC photovoltaic assemblies 502. The AC terminals of the plurality of three-phase micro-inverters 501 may be coupled with each other first to form a three-phase micro-inverter string, which is then coupled with the three-phase AC power grid 506. FIG. 6 is a schematic block diagram of a solar photovoltaic power generation system comprising a plurality of three-phase micro-inverters in another embodiment of the invention. Each three-phase micro-inverter 501 may be coupled with three DC photovoltaic assemblies 502. The plurality of three-phase micro-inverters 501 may be independent from each other, and have their AC terminals coupled directly with the respective phases and neutral wire of the three-phase AC power grid 506, respectively.

A specific schematic block diagram of a single-phase inverter circuit of the solar photovoltaic three-phase micro-inverter in this embodiment may also be as shown in FIG. 3. As shown, the single-phase inverter circuit 203 may comprise a DC-AC conversion circuit 2031, a DC voltage and current detection circuit 2032, an AC voltage and current detection circuit 2033, and a filter circuit 2034.

In this embodiment, the single-phase inverter circuit 203 may further comprise a control circuit 2035 and a communication circuit 2036. Of course, in this embodiment, the single-phase inverter circuit 203 may further comprise other necessary components which are known by those skilled in the art, without being limited to the above circuit structure.

Similarly, a schematic diagram of a solar photovoltaic three-phase micro-inverter with three single-phase inverter circuits sharing a comparison circuit, a control circuit and a communication circuit externally in this embodiment may also be as shown in FIG. 4.

As shown, in the three-phase micro-inverter 400, the control circuit 4035, the communication circuit 4036, and the comparison circuit 4037 are external to three single-phase inverter circuits 403, and are common parts shared by the three single-phase inverter circuits 403. Such a three-phase micro-inverter 400 can eliminate two sets of common circuits, so that not only the manufacture cost can be reduced, but also the reliability of the three-phase micro-inverter can be improved.

In this embodiment, the output currents and voltages of the three single-phase inverter circuits 403 will be detected respectively by the AC voltage and current detection circuits therein (not shown), and will be compared by the comparison circuit 4037. If unbalance between the three phases is found, the control circuit 4035 will adjust the respective power conversion operation of the three single-phase inverter circuits 403 to achieve the balance thereof. As a result, the output of the three-phase micro-inverter 400 can be maintained as a balanced three-phase AC current. Furthermore, the input currents and voltages of the three single-phase inverter circuits 403 may be used by the DC voltage and current detection circuit (not shown) to detect the balance between the three phases.

The solar photovoltaic three-phase micro-inverter can integrate three single-phase inverter circuits, which have input terminals coupled respectively with three DC photovoltaic assemblies, and output terminals coupled with the neutral wire and one of the three phases of the three-phase AC power grid, respectively. Because the three DC photovoltaic assemblies on one three-phase micro-inverter are disposed adjacently and thus have similar environment conditions, such as illumination, temperature, etc., the three-phase AC current can be well balanced, without employing excessive elements.

Furthermore, the balance between the three phases of the three-phase AC current coupled to the three-phase AC power grid can be achieved by adjusting the power conversion of the single-phase inverter circuit through the control circuit of the three-phase micro-inverter.

Although the invention has been disclosed above with preferred embodiments, which are not intended to limit the invention, possible variations and modifications can be made by those skilled in the art without departing from the spirit and scope of the invention. Accordingly, the scope of the invention is defined by the Claims of the invention.

What is claimed is:

1. A solar photovoltaic three-phase micro-inverter, comprising:
   DC terminals, coupled with three DC photovoltaic assemblies which are adjacent to each other, for receiving DC currents generated by the DC photovoltaic assemblies;
   three single-phase inverter circuits having input terminals coupled respectively with the three DC photovoltaic assemblies via the DC terminals, for converting the DC currents generated by the three DC photovoltaic assemblies to AC currents, respectively, wherein the three single-phase inverter circuits share a comparison circuit, a control circuit, and a communication circuit externally, wherein the comparison circuit is configured to compare an input/output current and voltage of the three single-phase inverter circuits respectively, and wherein the control circuit is configured to adjust the power conversion of the three single-phase inverter circuits if unbalance between the three phases is found;
   AC terminals coupled with a three-phase AC power grid, for grid-connectedly outputting the AC currents generated by the three single-phase inverter circuits;
   wherein output terminals of each single-phase inverter circuit are coupled respectively with a neutral wire and one of the three phases of the three-phase AC power grid.

2. The three-phase micro-inverter of claim 1, wherein the three single-phase inverter circuits are the same.

3. The three-phase micro-inverter of claim 2, wherein the single-phase inverter circuit comprises a DC-AC conversion circuit, a DC voltage and current detection circuit, an AC voltage and current detection circuit, and a filter circuit.

4. A solar photovoltaic power generation system, comprising a plurality of solar photovoltaic three-phase micro-inverters, the plurality of three-phase micro-inverters having AC terminals coupled with the respective phases and neutral wire of a three-phase AC power grid respectively, wherein each three-phase micro-inverter comprises:
   DC terminals, coupled with three DC photovoltaic assemblies which are adjacent to each other, for receiving DC currents generated by the DC photovoltaic assemblies;
   three single-phase inverter circuits having input terminals coupled respectively with the three DC photovoltaic assemblies via the DC terminals, for converting the DC currents generated by the three DC photovoltaic assemblies to AC currents, respectively, wherein the three single-phase inverter circuits share a comparison circuit, a control circuit, and a communication circuit externally, wherein the comparison circuit is configured to compare an input/output current and voltage of the three single-phase inverter circuits respectively, and wherein the control circuit is configured to adjust the power conversion of the three single-phase inverter circuits if unbalance between the three phases is found;
   AC terminals coupled with the three-phase AC power grid, for grid-connectedly outputting the AC currents generated by the three single-phase inverter circuits;
   wherein output terminals of each single-phase inverter circuit are coupled respectively with a neutral wire and one of the three phases of the three-phase AC power grid.

5. The solar photovoltaic power generation system of claim 4, wherein the AC terminals of the plurality of three-phase micro-inverters are coupled with each other first to form a three-phase micro-inverter string, which is then coupled with the three-phase AC power grid.

6. The solar photovoltaic power generation system of claim 5, wherein the three single-phase inverter circuits in each three-phase micro-inverter are the same.

7. The solar photovoltaic power generation system of claim 6, wherein the single-phase inverter circuit comprises a DC-AC conversion circuit, a DC voltage and current detection circuit, an AC voltage and current detection circuit, and a filter circuit.

8. The solar photovoltaic power generation system of claim 4, wherein the plurality of three-phase micro-inverters are independent from each other, and have their AC terminals coupled with the respective phases and neutral wire of the three-phase AC power grid, respectively.

9. The solar photovoltaic power generation system of claim 8, wherein the three single-phase inverter circuits in each three-phase micro-inverter are the same.

10. The solar photovoltaic power generation system of claim 9, wherein the single-phase inverter circuit comprises a DC-AC conversion circuit, a DC voltage and current detection circuit, an AC voltage and current detection circuit, and a filter circuit.

11. The solar photovoltaic power generation system of claim 4, wherein the three single-phase inverter circuits in each three-phase micro-inverter are the same.

12. The solar photovoltaic power generation system of claim 11, wherein the single-phase inverter circuit comprises a DC-AC conversion circuit, a DC voltage and current detection circuit, an AC voltage and current detection circuit, and a filter circuit.

* * * * *